United States Patent [19]

Brunner

[11] Patent Number: 4,863,141

[45] Date of Patent: Sep. 5, 1989

[54] ELECTROMAGNETICALLY OPERABLE VALVE

[75] Inventor: Rudolf Brunner, Baldham, Fed. Rep. of Germany

[73] Assignee: 501 Heilmeier and Weinlein Fabrik Fur Oel-Hydraulik GmbH & Co. KG, Munich, Fed. Rep. of Germany

[21] Appl. No.: 592,589

[22] Filed: Mar. 23, 1984

[30] Foreign Application Priority Data

Mar. 30, 1983 [DE] Fed. Rep. of Germany ....... 3311690

[51] Int. Cl.$^4$ .............................................. F16K 30/02
[52] U.S. Cl. ............................ 251/129.2; 251/129.15
[58] Field of Search .................. 251/138, 244, 129.15, 251/129.2; 335/251, 261, 275, 191, 228

[56] References Cited

U.S. PATENT DOCUMENTS

| 802,959 | 10/1905 | Waterman | 251/138 |
|---|---|---|---|
| 1,915,822 | 6/1933 | Green | 251/138 |

Primary Examiner—Kenneth J. Dorner
Assistant Examiner—Gerald A. Anderson
Attorney, Agent, or Firm—Kinzer, Plyer, Dorn, McEachran & Jambor

[57] ABSTRACT

An electromagnetically operable valve, comprising a coil and an electromagnet containing an armature, the armature of which impinges an actuating member connected to or forming an active member of the valve in operating connection and a lever mechanism arranged between the armature and the valve member for the step-up or step-down transmission of the stroke.

In valves of this kind known from prior art a considerable expense in construction is incurred for the accommodation of the lever mechanism which offsets the savings with respect to the costs and the constructive area in long-stroke magnets; this is avoided by a novel construction incorporating the lever mechanism into the electromagnet and between the armature and the actuating member.

4 Claims, 8 Drawing Sheets

ELECTROMAGNETICALLY OPERABLE VALVE

The invention relates to an electromagnetically operable valve according to the preamble of patent claim 1.

A magnetically operable servo seat valve is known from the magazine "und-oder-nor+Steuerungstechnik" ("and/or−nor+Control Technique"), 9/79, page 426, information 2.2, where the magnetic armature directly acts via a plunger on the valve closing member. The electromagnet is relatively voluminous so that a small stroke (approximately 0.5 mm) it exerts an actuating force which is as large and as uniform as possible. Such magnet types not only are heavy but also unusually expensive because due to limited possibilities of applications they are manufactured in small numbers of units.

A hydraulic path valve in piston slide design is known from the magazine "Control Revue" 3/1980, page 19, FIG. 5 where two proportional magnets are provided with relatively long armature strokes at low actuating force for the actuation of the slide. These magnet types are comparatively light, slim and attractive in price because based on multiple possibilities of applications they are manufactured and applied in large numbers of units.

An attempt was made to utilize these constructive and price-wise advantages of the last-named valves also for valves with a small actuating stroke and a high actuating force. It is known from the European Pat. No. 81 10 7196, the German Publication Copy 21 49 915 and the British Pat. No. 41 62 44 to apply in each case an electromagnet with relatively long strokes, as it would be usable per se for slide valves, in servo valves with an interposed lever mechanism, whereby the lever mechanism gears down the stroke path of the armature of the electromagnet and boosts the actuating force. However, expensive intermediate housings with corresponding bearing locations are required for the accommodation of the lever mechanism which in most cases offset the savings in construction work and cost due to the use of compact and long-stroked electromagnets. The result is an inapproprirate enlargement of the entire construction unit of the electromagnetically operable valve and also an undesirable increase in weight.

The invention is based on the technical problem of creating a magnetically operable valve of the initially mentioned type where practically independently of the fact whether this relates to a long-stroke valve with low actuating force or a short-stroke valve with high actuating force, a basic type of magnet is used, whereby a compact design of the construction unit of the magnetically operable valve is to be accomplished.

The problem as posed is solved by the characteristics recited in the characterizing part of the principal claim.

With this design it is possible to also use in the case of short-stroke valves an electromagnet with relatively long armature strokes and low actuating force, which is attractive in price, and of compact dimensions. The electromagnet may be connected directly to the valve, so that the entire construction unit of the magnetically operable valve is compact. The lever mechanism is integrated constructively into the electromagnet, yet its exterior dimensions need not be modified substantially. Furthermore, the overall weight of the construction unit is not increased inappropriately. The particular advantage of this design resides in the fact that such electromagnets can be used which, thanks to their mass production, are attractively priced and have compact exterior dimensions. For these magnets also are usable for long-stroke valves, as long as the lever mechanism is blocked or removed.

Precisely this last-named advantage can be realized in a simple manner with an embodiment in which the lever mechanism is integrated to the armature 2. Then all that is necessary is to replace the magneto armature with the lever mechanism by a magneto armature without a lever mechanism and/or following removal of the magneto armature the lever mechanism is blocked or a direct drive connection is established between the actuating member and the magneto armature.

It is obvious that with the lever mechanism a step-up transmission for the actuating member also can be accomplished in special cases of application. However, in that case the actuating force is decreased and not increased. However, this case of application also could be accomplished with the design according to the invention in a particularly simple and expedient manner.

Another appropriate embodiments is one wherein two scissorlike overlapping levers lead to the fact that the operating force and the actuating stroke of the magneto armature are transmitted to the actuating member without imbalance. It is possible to design the levers accordingly as each one has only to transmit half of the actuating force of the magneto armature.

Another appropriate embodiment is one wherein the electromagnet itself and/or its coil housing or its stationary armature part is used for the satisfactory and effective transmission of force from the armature to the actuating member. In this supporting design the reaction forces are accommodated as they result from the transmission of force from the armature to the actuating member.

An advantageous embodiment also is one wherein the lever mechanism is located within the longitudinal extension of the armature, appropriately within an area where it least influences the function of the electromagnet.

In another appropriate embodiment low influence of the function of the electromagnet is pursued along with an easy possibility of changeover in the event that the electromagnet is to be used for the actuating of a long-stroke valve, for which the lever mechanism is not required. In this case the lever mechanism is located outside the armature in a gap area between the armature and the stationary armature portion.

In an additional embodiment the lever mechanism is positioned pivotably in the armature and entrained by it as it is being moved in such a fashion as to achieve a reduced or a step-down stroke.

In the previously explained embodiment of the invention, where the lever mechanism is accommodated within the longitudinal extension of the magneto armature, it is appropriate to proceed so that an effective transmission of force from the armature to the actuating member is assured. The reaction forces necessary for this transmission of force are mustered via an extension of the armature tubing.

One embodiment proves to be particularly appropriate for the art. In this, a slot in the armature is accommodated in an area where the slot and the lever mechanism can exert practically no influence at all upon the operation of the electromagnet. Simply by a simple machining of the end of a given armature an electromagnet appropriate per se for a long-stroke valve is modified also for the actuating of a short-stroke valve. Thereby, in an advantageous manner neither does the length of the armature have to be reduced nor does the length of the armature tube have to be increased.

An additional appropriate measure is to avoid large bearing surface areas in which inadmissibly large portions of the forces to be transmitted would be wasted.

A particularly stable transmission of force can be accomplished where the influence of friction during the transmission of force is reduced to a negligible measure by the application of rollers.

In yet another embodiment, an articulated location is created, in a manner of speaking, between the lever acting on the actuating member and the actuating member, said articulated location seeing to it that components of force acting exclusively in the longitudinal direction of the actuating member are used for the actuation of the valve and that the actuating member cannot jam in the armature.

Another alternate measure would also be appropriate in the form of a cap which could consist of a wear-resistant and yet easily sliding material.

Another important object is a manufacturing technique which at low cost assures a design true to form and exact as to dimensions.

In another appropriate embodiment a particularly compact solution is presented which is particularly appropriate under limited space conditions.

The valve itself may be integrated to a large extent into the electromagnet, being assigned an additional function, namely that of the stationary armature part.

A particularly compact and universally applicable solution of an electromagnetically actuated valve is one wherein the lever mechanism not only is connected effectively in the transmission path from the magneto armature to the actuating member but it also is used in case of an emergency actuation for boosting the actuating force and/or to stepdown (reduce) the emergency actuation stroke. Conversely, the emergency actuating installation of this electromagnetically operable valve is used to support the reaction forces of the lever mechanism when the electromagnet operates in the normal fashion.

Embodiments of the subject of the invention are explained by means of the drawings.

Figure 1:
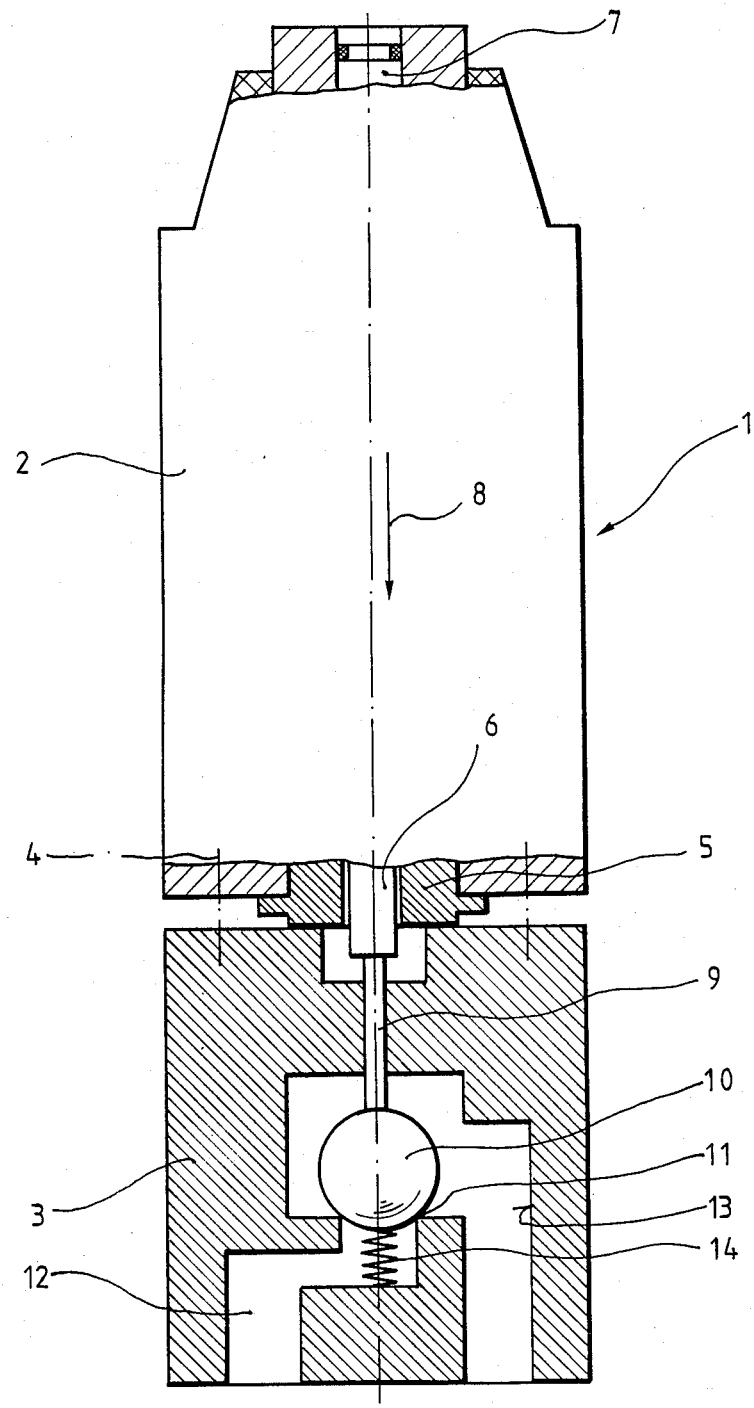
FIG. 1 shows a schematic lateral view, partly in section of an electromagnetically operable switching valve.

FIG. 1 shows a magnetically operable valve 1 which primarily consists of an electromagnet 2 and a seat valve 3, the magnet and the valve being interconnected by securing members 4. On the bottom is shown the end of a stationary armature part 5 of the electromagnet 2 which is of conventional design. The end of an actuating member 6 protrudes through said armature part. An emergency actuating member 7 can be seen at the upper end of the electromagnet 2. With the member 7 the actuating member 6 can be shifted manually, in the event of a failure of the electromagnet 2. The direction of attraction of the armature not shown of the electromagnet 2 is identified by 8. A stem or rod 9 is positioned in the housing of the seat valve 3, said stem being impinged (engaged) by the lower end of the actuating member 6 cooperating with a closing member 10 in the shape of a sphere which can be placed on a valve seat 11. The valve seat 11 separates an inflow channel 12 from a discharge channel 13. The closing member 10 is biased opposite to the direction of attraction 8 by a valve spring 14 in the opening direction. The electromagnet 2 which will be explained below in detail by means of various embodiments is of a design where a relatively low force of actuation is mustered over a relatively long actuating stroke. Such electromagnets are constructed in large numbers of units so that they are available in the trade at attractive prices. Such electromagnets are used on a large scale for the actuation of long-stroke valves, for example control slides or the like. However, it is necessary for a short-stroke valve, for example the seat valve as shown in FIG. 1, that the electromagnet muster a relatively large force of actuation over a relatively low actuation stroke. For that purpose in the embodiments explained below for the electromagnets a lever mechanism is placed between the actuating member for the valve and the armature of the electromagnet, said lever mechanism being used for the step-up and step-down transmission of the force.

Figure 2:
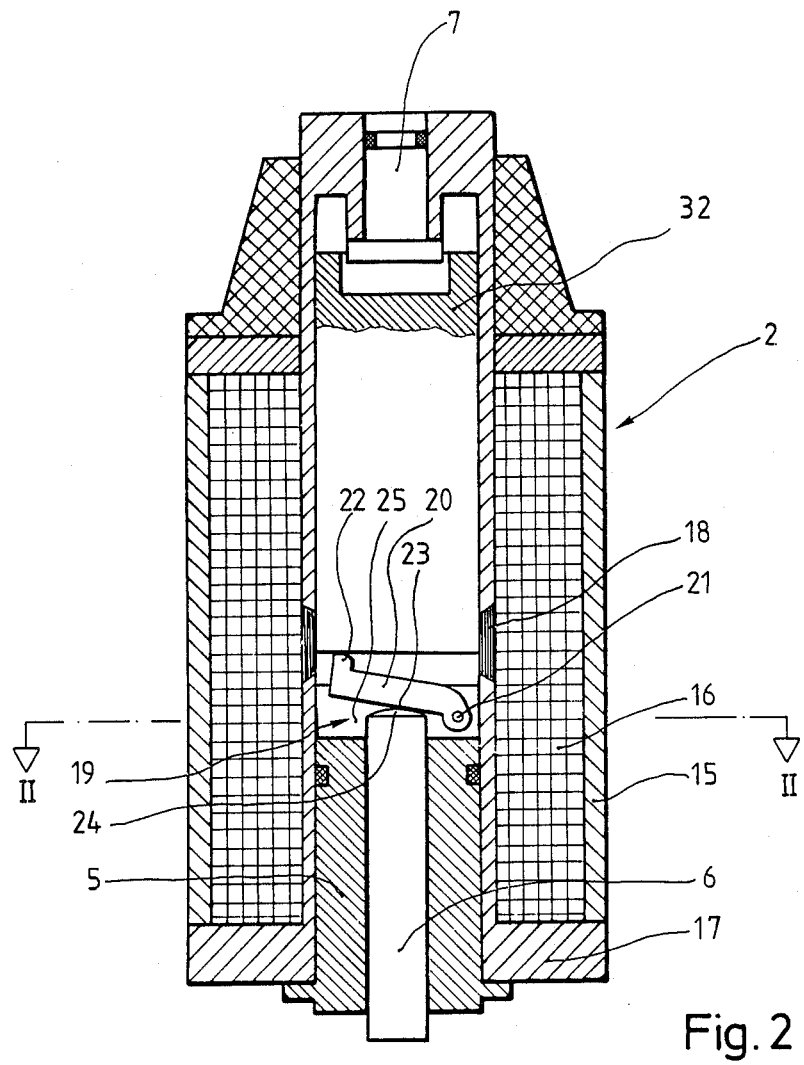
FIG. 2 shows a longitudinal section through a first embodiment of an electromagnet for actuating such a valve.
Figure 2A:
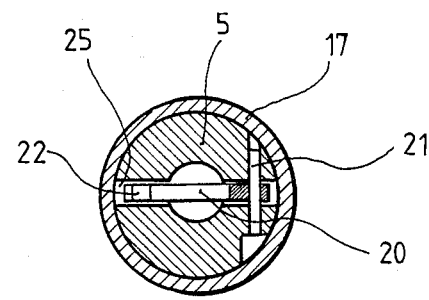

In an embodiment of an electromagnet 2 according to FIG. 2 and FIG. 2a a magnetic coil 16 is placed in an exterior tube 15. An armature tube 17 passes through the inner opening of the coil 16 and has an insulating longitudinal section 18 which in a known manner influences the operational behavior of an armature 32 guided displaceably in the armature tube 17. The armature 32 is cylindrical in shape and in deenergized electromagnets it occupies the position shown in FIG. 2 where it is spaced with respect to the upper end of the stationary armature part 5. The actuating member 6 is designed here as a rod having a ball-like terminal surface 24 and protruding with its free end into a slot 25 formed in the upper end of the stationary armature part 5. A lever mechanism 19 consisting of a hammer-shaped (L-shaped) lever 20 with a pivotal axis 21 and a ball-shaped pressure area 22 is located in the area of this slot 25. The pivotal axis 21 is formed by a pin which is arranged in the stationary armature part 5 and traverses the slot 25.

The emergency actuating member 7 furthermore is located in the armature tube 17 at the end facing away from the actuating member 6 in the shape of a piston in a displaceable manner and it is supported there.

When the coil 16 is supplied with current, a magnetic field forms, the field lines of which pull the armature 32 in FIG. 2 downward, whereby the armature pivots the lever 20 with the lower terminal surface of said armature counterclockwise about the pivot 21. Because the lever arm with which a bearing surface 23 of the lever 20 bears on the ball-shaped surface 24 of the actuating member 6 is smaller than the lever arm between the pressure area 22 and the pivotal axis 21, the actuating stroke of the actuating member 6 will be smaller than the actuating stroke of the armature 32, while the actuating force at the actuating member 6 is larger than the actuating force mustered by the armature 32.

Figure 3:
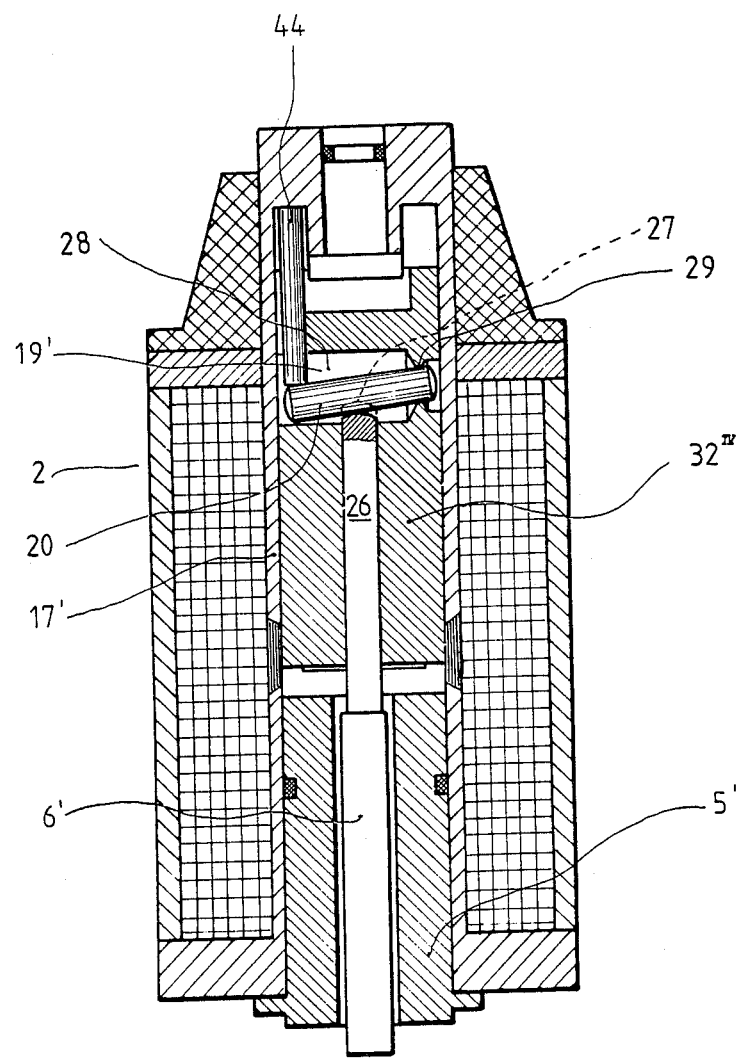
FIG. 3 shows a longitudinal section through another embodiment of an electromagnet.

In the embodiment according to FIG. 3 a stationary armature part 5', modified with respect to the previous embodiment, and an actuating member 6' are provided. Actuator 6' is provided with an extension 26 as far as the interior of the armature 32'''', into a recess 28, where it terminates with a forklike and rounded bearing surface 27.

The lever mechanism 19' is located in the recess 28, and it possesses a lever 20 in the shape of a cylindrical pin. The lever 20 is positioned pivotably in a pivotal bearing means 29 of the armature 32'''' so that it must participate in the movement of the armature. The lever 20 engages the extension 26 of the actuating member 6' in the area of the bearing surface 27 and is supported additionally by a pin (or stop) 44 located at the end of the armature tube 17'. The pin 44 traverses the bottom of the armature 32'''' located on the top and extends as far as the recess 28.

When the coil is energized, the armature 32'''' moves in the direction toward the stationary armature part 5' and thereby forces via the pivotal bearing means 29 the right end of the lever 20 downward, whereby the pin or stop 44 forms a second pivotal point for the lever 20 which is stationary with reference to the armature tube 17'. Again, due to the differential lever arms between the actuating force of the armature 32'''' attacking at the lever 20 and the reactive force of the actuating member 6' the latter is impinged with an increased actuating force via a shortened stroke.

Figure 4:
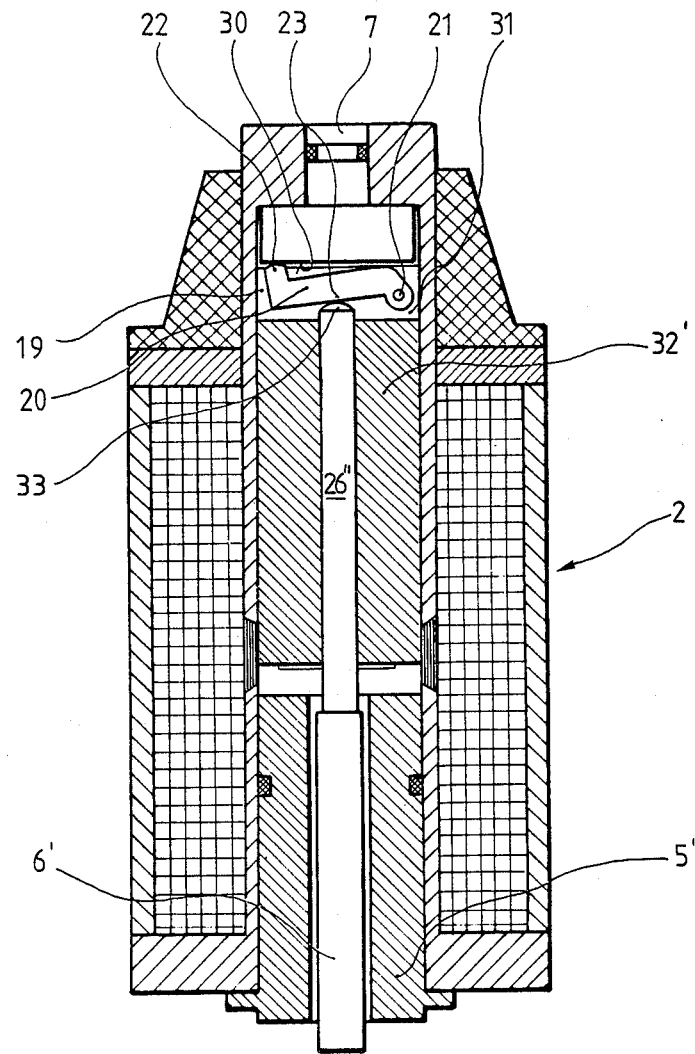
FIG. 4 shows an additional embodiment of an electromagnet in a longitudinal section.

In the embodiment of the electromagnet 2 according to FIG. 4 the lever mechanism 19 which is approximately identical with the lever mechanism 19 of FIG. 2, is arranged in a slot 31 in the end of the armature 32' which is the posterior end in the direction of attraction. There no influencing of the magnetic flux is to be expected from the lever mechanism 19. The actuating member 6' extends with its extension 26'' into said slot 31, where it terminates with a ball-shaped bearing surface 33 which is associated with the opposed bearing area 23 of the lever 20. The lever 20 is positioned pivotably about the pivotal axis 21 in the armature 32', said pivot axis again being formed by a transverse pin traversing the slot 31. The ball-shaped pressure area 22 of the lever 20 is engaged by a lower surface of the emergency actuating member 7 which is supported in the armature tube.

As the armature 32' is attracted, it moves the pivot means 21 downward, so that the lever 20 reduces the stroke path, thereby increasing the actuating force.

Figure 5:
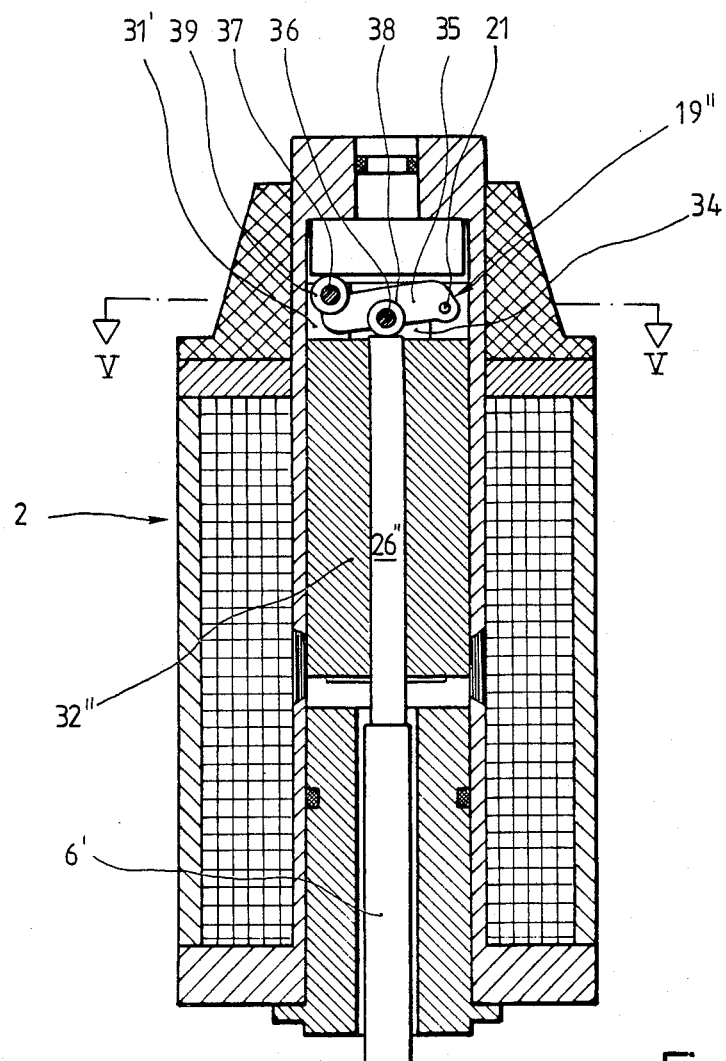
FIG. 5 shows an additional embodiment of an electromagnet in a longitudinal section.
Figure 5A:
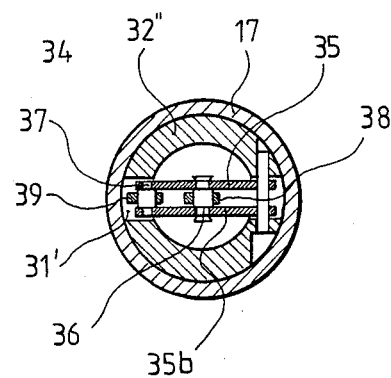
FIG. 5a shows a cross section through the embodiment of FIG. 5 in the plane V—V.

In the additional embodiment according to FIGS. 5 and 5a the lever mechanism 19'' again is accommodated in a slot 31' in the end of the armature 32'' which is posterior in the direction of attraction. The extension 26'' of the actuating member extends into said slot in the area of a pocket 34. The lever of the lever mechanism 19'' identified by 35 is designed as a double lever, that is to say it consists of two parallel and symmetrically arranged levers 35 and 35b which are placed in spaced relationship and pivotable jointly about the pivot axis 21 in the armature 32''. Rollers 38 and 39 are positioned rotatably about shafts 36 and 37 between both levers 35b, 35a, said shafts being secured in both levers.

As the armature 32'' is attracted the armature stroke again is transmitted in a step-down fashion and the actuating force is increased, whereby the rollers 38 and 39 respectively roll on the extension 26'' and the emergency actuating member 7', while reducing any friction forces. That way a unilateral or off-center jamming of the extension 26'' which is guided slidingly in the armature 32'' is thereby avoided.

Figure 6:
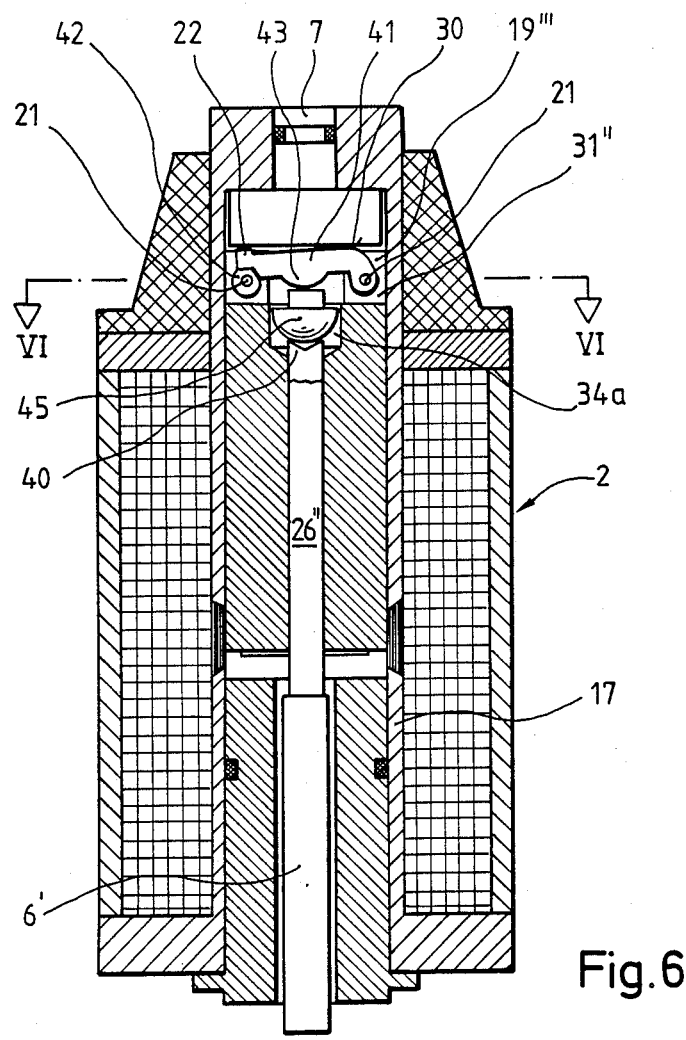
FIG. 6 shows a longitudinal section through another embodiment of an electromagnet.
Figure 6A:
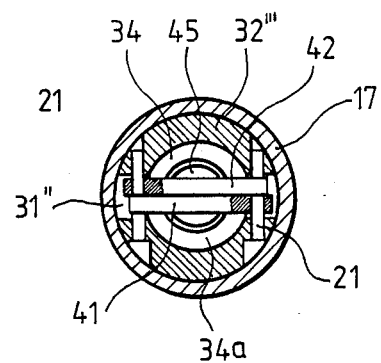
FIG. 6a represents a cross section in the plane VI—VI of FIG. 6.

In the embodiment of the electromagnet 2 shown in FIGS. 6 and 6a, the lever mechanism 19''' again is accommodated in a slot 31'' in the end of the armature 32''' which is posterior in the direction of attraction. The lever mechanism 19''' differs from the preceding one by having two levers 41, 42 (FIG. 6a) which overlap shearlike and are supported by two pivot axis 21 in the slot 31'', said pivot axis 21 again being formed by pins traversing the slot. With this arrangement of the levers 41, 42 not only the load for each lever is cut in half but also a rectilinear (straight) impinging or engagement of the extension 26''' of the actuating member 6' is accomplished. Each lever 41, 42 possesses a ball-shaped bearing surface 43 with which it engages a reduced protuberance of a mushroom-shaped pressure member 45 which is placed with a ball-shaped pressure or bearing surface in a recess 40 at the end of the extension 26'''. The end of the armature 32''' again possesses the recess or pocket 34 which is extended with a section 34a to accommodate the pressure member 45. The ball-shaped pressure areas 22 of both levers 41, 42 are supported at the bottom side 30 of the emergency actuating member 7 and thereby in the anchor tube 17.

As the armature 32''' is attracted both pivot axis 21 are pulled downward, so that both levers pivot shearlike against each other, thereby reducing the actuating stroke of the armature 32'''', while the actuating force at the actuating member 6' is increased.

Figure 7:
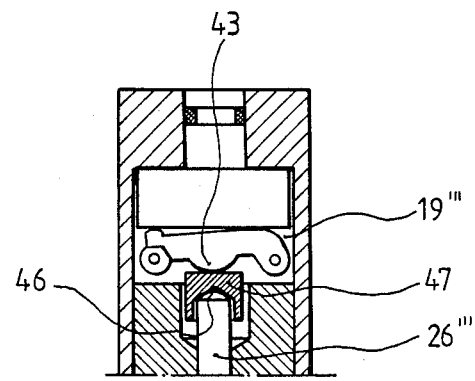
FIG. 7 shows a longitudinal partial section through another embodiment.

In the embodiment according to FIG. 7 the lever mechanism 19''' corresponds with the one of FIG. 6. A cap 47 is provided with a conical recess 46 which provides for a rectilinear transmission of the forces and a wear-free operation when placed on the upper end of extension 26''' and positioned between the ball-shaped bearing surface 43 of both levers and the end 46 or the extension 26''' which likewise is of ball-shaped design.

Figure 8:
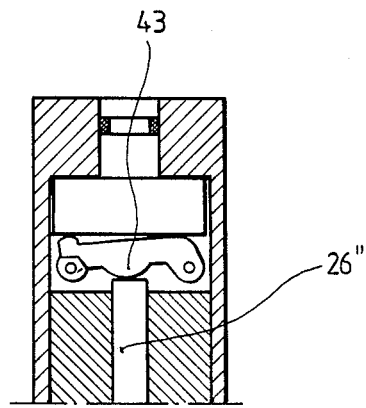
FIG. 8 represents a partial longitudinal section through another embodiment.
Figure 9:
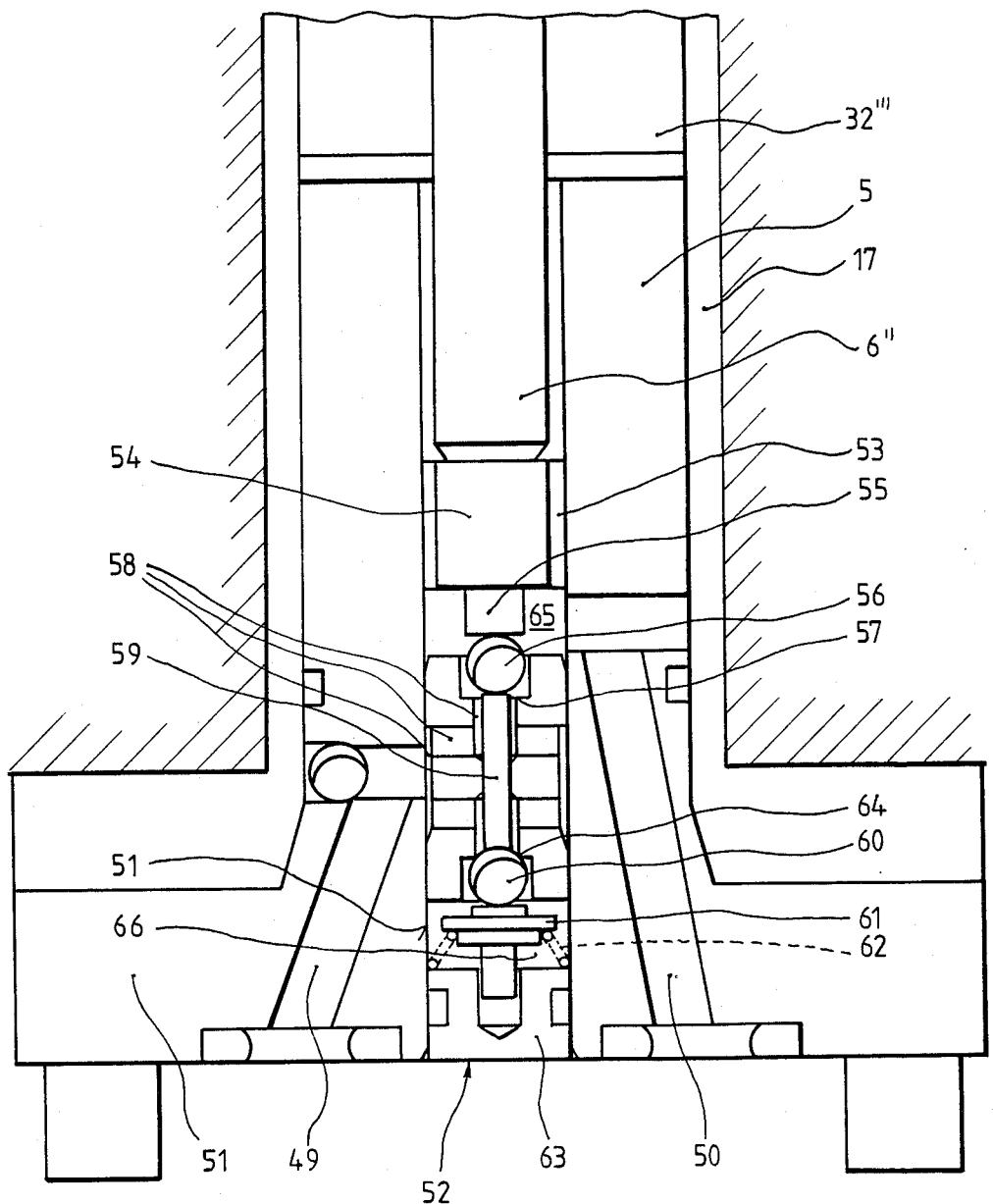

In the embodiment according to FIG. 8 the ball-shaped bearing surfaces 43 of both levers acct directly on the smooth (flat) end of the extension 26''. Due to the ball-shaped bearing surface 43 and the levers overlapping in a shearlike fashion here too a rectilinear transmission of force upon the actuating member, not shown, is achieved.

In the above described embodiments the lever mechanism is used as a step-down (reduced or shortened) stroke transmission and simultaneous step-up (increased or multiplied) transmission of force between the armature and the actuating member. However, without any problem the lever mechanism also could be used as a stroke step-up or multiplier and a force step-down transmission. For example the actuating member then would be arranged staggered more to the side, so that the lever arm would become smaller between the articulation of the lever at the armature and the supporting means than the lever arm between the supporting means and the actuating member. This would be appropriate for such cases of application where the actuating force almost no longer is of any significance, but where a very long actuating stroke has a high priority. Even for this case of application one and the same electromagnet type could then be used.

The above described electromagnets shown in different variants of embodiments may also be applied to slide valves with larger actuating strokes. This merely requires, either to block the lever mechanism in function of the design of each embodiment and to provide a direct operating connction between the armature and the actuating member or to replace the armature against another armature without the lever mechanism. In any event this is a measure more attractive in price and more effortless than the purchasing and storing of electromagnets intended for the different applications and differing with respect to fabrication and structure. Different cases of application can be satisfied in a particularly advantageous manner with one single basic type of an electromagnet.

I claim:

1. An electromagnetically operable valve, comprising a coil in a coil housing and an electromagnet containing a movable armature within a stationary armature tube, an actuating member for the valve and a lever mechanism having at least one lever connecting the armature with the actuating member, said lever being supported on a stationary support, and said lever mechanism being disposed entirely within the stationary armature tube of the electromagnet.

2. The electromagnetically operable valve as defined in claim 1 in which the lever mechanism is engaged directly with one end of said armature.

3. The electromagnetically operable valve as defined in claim 2 having a stationary part inserted into the armature tube, and wherein the support of the lever is secured to the inserted part.

4. The electromagnetically operable valve as defined in claim 3 wherein the actuating member is coaxial with the armature tube and has one end bearing on the lever to be actuated thereby, a pivot axis forming the support for the lever being secured to the inserted part, said lever having one lever arm engaged with said movable armature and a shorter lever arm engaged with said actuating member, respectively, in relation to said pivot axis.

* * * * *